April 1, 1941.   S. GOLUB ET AL   2,236,819
PHYSICIAN'S HEAD UNIT
Filed March 29, 1938    2 Sheets-Sheet 1
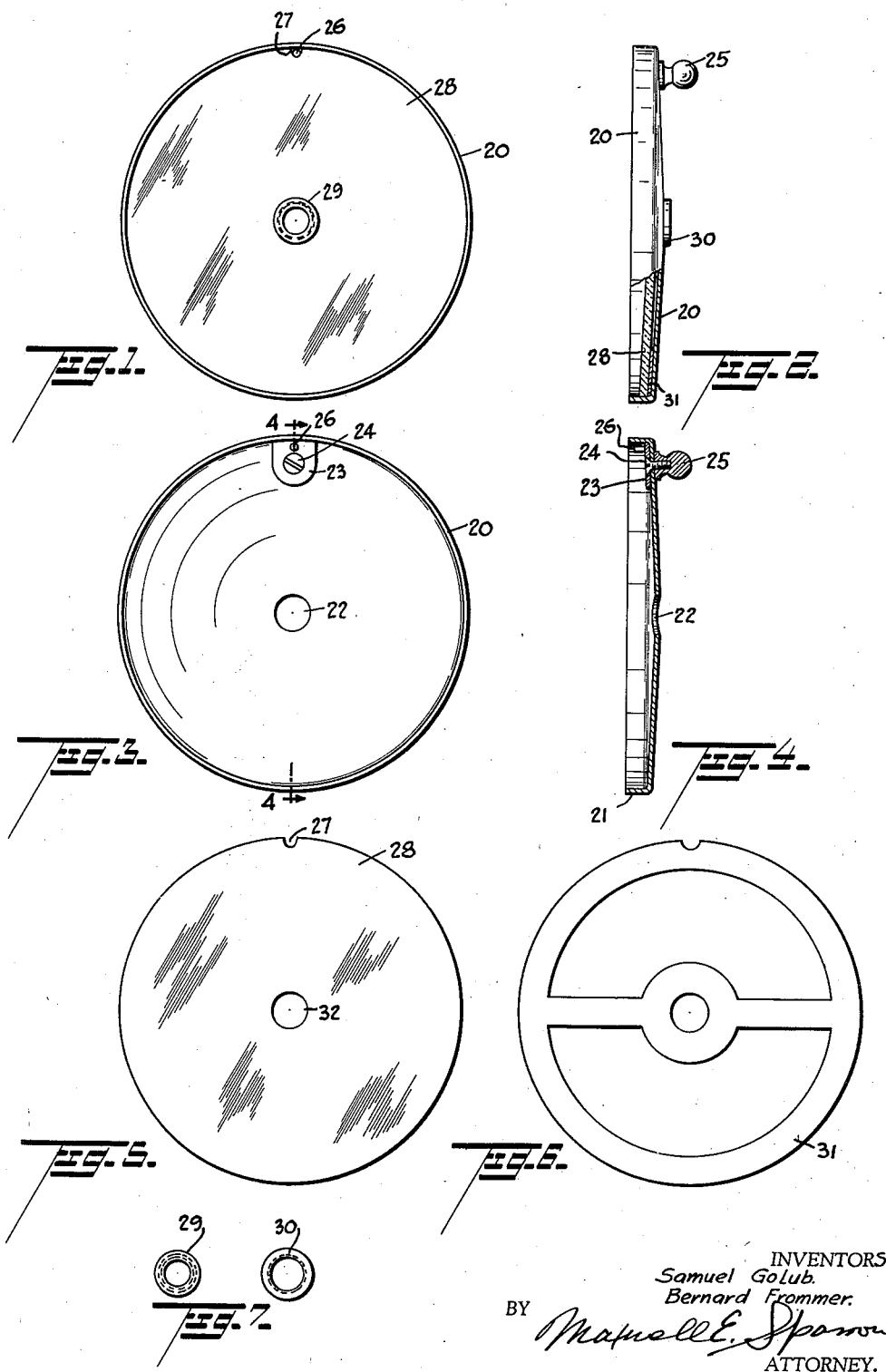
INVENTORS.
Samuel Golub.
Bernard Frommer.
BY
ATTORNEY.

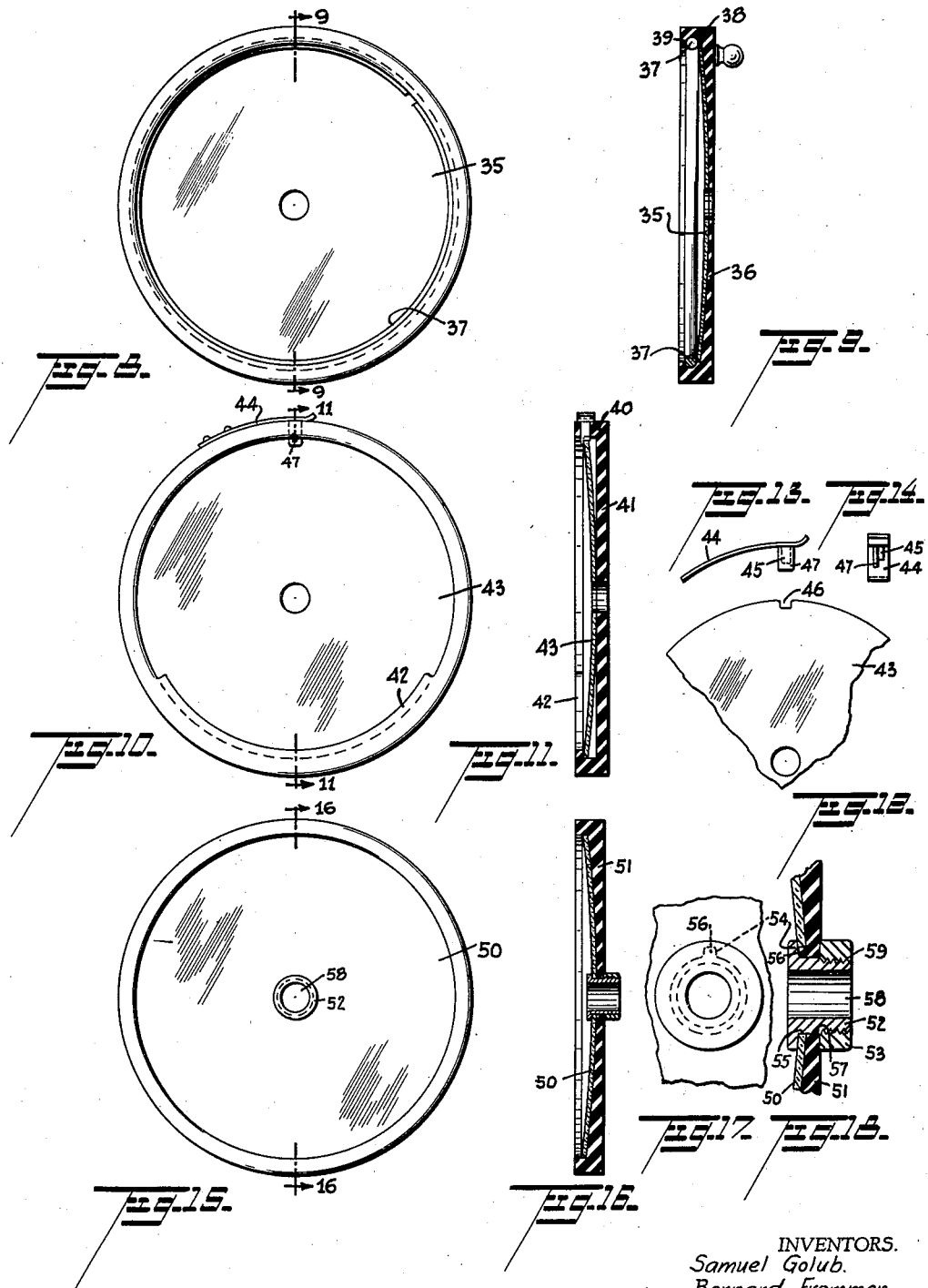

Patented Apr. 1, 1941

2,236,819

UNITED STATES PATENT OFFICE 2,236,819

PHYSICIAN'S HEAD UNIT

Samuel Golub and Bernard Frommer, New York, N. Y.

Application March 29, 1938, Serial No. 198,649

1 Claim. (Cl. 128—21)

This invention relates to improvements in physician's head units.

Heretofore head units used by physicians were so constructed that the mirror or reflector was permanently united to the base. This construction possessed an inherent disadvantage due to the fact that when the mirror or reflector was damaged the entire unit had to be discarded and replaced. This was highly wasteful and uneconomical.

It is an object of this invention to provide a physician's head unit wherein the mirror or reflector may be readily and easily replaced when necessary or desired.

It is a further object of this invention to provide a head unit in which the reflector will not shift or rotate relative to the base.

It is a further object of the present invention to provide a physician's head unit wherein a mirror or other reflector is removably secured to a base preferably at the centers thereof, the reflector, base and means having registered or aligned openings providing a passage for peering therethrough.

It is a further object of the present invention to provide a physician's head unit wherein a mirror or reflector is removably secured to a base, said base and said reflector being provided with cooperating locking means for preventing shifting of the reflector relative to said base, and preferably with cushioning means interposed between the reflector and base.

It is a still further object of this invention to provide an efficient, economical and practical head unit for physicians.

Further objects and advantages of the invention will appear from the following disclosure thereof together with the attached drawings which illustrate certain forms of embodiment thereof. These forms are shown for the purpose of illustrating the invention since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

Fig. 1 is a front view of a head mirror embodying and employing the invention;

Fig. 2 is a partial sectional view of Fig. 1;

Fig. 3 is a front view of the reflector housing;

Fig. 4 is a sectional view thereof taken along line 4—4 of Fig. 3;

Fig. 5 is a front view of the mirror element;

Fig. 6 is a plan view of a cushioning element employable in the invention;

Fig. 7 illustrates the male and female securing elements for the device;

Fig. 8 is a front view of a further embodiment of the invention;

Fig. 9 is a sectional view taken through line 9—9 of Fig. 8;

Fig. 10 is a front view of a still further embodiment of the invention;

Fig. 11 is a sectional view taken through line 11—11 of Fig. 10;

Fig. 12 is a front view of a fragment of the mirror;

Figs. 13 and 14 are detailed views of mirror locking means for the device shown in Figs. 10 and 11;

Fig. 15 is a front view of another embodiment of the invention;

Fig. 16 is a sectional view taken through line 16—16 of Fig. 15;

Fig. 17 is a front fragmentary view of the device shown in Figs. 15 and 16 at the sight opening thereof; and Fig. 18 is a sectional view taken through the center of Fig. 17.

Referring to Figs. 1 to 7 which show an example of realizing the invention, the numeral 20 indicates a base or housing having an annular upstanding flange 21. Base 20 may be made of any suitable material such as metal, plastic composition rubber, etc. At the center of base 20 there is provided a sight opening 22 and adjacent the rim or flange 21 a plate 23 is secured to base 20 by such means as for example a screw 24 which threadedly engages a knob 25 extending from the opposite face of base 20. Knob 25 is employed in the conventional manner for example as a universal connection to a physician's head strap device (not shown).

Plate 23 may be provided with a pin 26 which is received in a slot or recess 27 formed in the mirror or reflector 28. Pin 26 functions as a stop to prevent the mirror from shifting or rotating. Mirror or reflector 28 is preferably concave and provided with a sight opening 32.

Mirror 28 is secured to housing 20 by means of the interengagement of the male and female parts seen in Fig. 7 and indicated by the numerals 29, 30, respectively. The parts 29 and 30 are preferably threadingly engaged and thus held together. When it is desired to disassemble the mirror from the housing the parts 29 and 30 are merely unscrewed. There may be interposed between the mirror 28 and housing 20 a cushioning member an example of which is shown in Fig. 6 and indicated by numeral 31.

Figs. 1 and 2 show the device in assembled condition ready for use.

Figs. 8 and 9 show a further embodiment of the invention in which the mirror or reflector 35 is secured to base 36 by means of an annular spring 37 seated in the recess 38 provided in the rim portion 39 of base or housing 36.

Figs. 10 to 14 show the invention in a further modified form in which instance the annular flange portion 40 of base 41 is provided with an arcuate inwardly extending lip portion 42. Reflector 43 is inserted between the lip portion 42 and rear face of base 41, the reflector is retained within housing 41 in the following manner. Secured to the rim or periphery 40 of the base is the leaf-spring 44. This leaf-spring has a pendant 45 which is held within recess or slot 46 of mirror 43 by means of the spring 44. Pendant 45 is provided with a flat projection 47 which overlaps mirror 43 at the notch 46 to facilitate retention of the mirror against the base.

Referring to the embodiment disclosed in Figs. 15 to 18, inclusive, the mirror or reflector 50 is secured to the plate or housing 51 by means of interengaging male and female fittings 52, 53, respectively. Mirror or reflector 50 has a notch or recess 54 at its central opening 55, the said slot 54 receiving a projection 56 located on the base 51 adjacent its central opening 57; in this manner the mirror is kept from shifting or rotating.

In assembling the device the mirror is placed with its back against the adjacent surface of base 51 and with its notch 54 in register with projection 56. The shank portion of bushing 52 is passed through the registering openings 55, 57 of the mirror and base, respectively, and made to threadedly engage the female element 53 to secure the mirror and base together. The element 52 has a central opening 58 providing a passage for peering therethrough. Members 52 and 53 are threadedly engaged at 59 thereby securing the reflector 50 to base 51.

The male element 52 is preferably provided with a flange of sufficient width to conceal both the notch 54 and pin 56. It is understood that the pin or projection 56 may be provided on the male member 53 in lieu of the projection on the base 51 or there may be provided projections on both the male element 53 and base 51 with corresponding notches on the mirror.

In the accompanying drawings we have illustrated the invention embodied in one of its practical commercial forms but as this illustration is primarily for purposes of disclosure it will be understood that the invention is not limited to this particular form of structure and that it may be modified in many respects without departure from the true spirit and scope of the invention as herein defined and claimed. We wish it further understood that the terms which we have employed herein are used in a descriptive rather than in a limiting sense, except, however, for such limitations that may be imposed by the state of the prior art.

Having thus described our invention, what we claim as new and desire to secure by Letters Patent, is:

In a physician's head mirror a base and reflector provided with registering openings for peering therethrough, fastening means for removably securing said reflector and said base together, said means having a passageway registering with said openings for peering therethrough, and cooperating locking means on said base and said mirror for preventing relative shifting of the mirror and base.

SAMUEL GOLUB.
BERNARD FROMMER.